United States Patent [19]

Patel

[11] 4,267,026
[45] May 12, 1981

[54] SPENT BRINE CONCENTRATION USING MICROWAVE ENERGY

[75] Inventor: Harshad M. Patel, Cleveland, Tenn.

[73] Assignee: Olin Corporation, New Haven, Conn.

[21] Appl. No.: 106,180

[22] Filed: Dec. 21, 1979

[51] Int. Cl.³ ............................................. C25G 1/34
[52] U.S. Cl. ..................................... 204/98; 204/128; 203/100
[58] Field of Search .................... 203/100; 204/48, 128

[56] References Cited

U.S. PATENT DOCUMENTS

| 3,209,812 | 10/1965 | Sargeant | 203/100 |
| 3,577,322 | 5/1971 | Nesbitt et al. | 203/100 |
| 3,607,667 | 9/1971 | Knapp et al. | 203/100 |

FOREIGN PATENT DOCUMENTS 54-23099  2/1979  Japan ......................... 204/98

OTHER PUBLICATIONS

"Chlorine ... ", Sconce, Rheinhold, 1962, pp. 132–136.

Primary Examiner—R. L. Andrews
Attorney, Agent, or Firm—James B. Haglind; Donald F. Clements

[57] ABSTRACT

A process for the concentration of spent brine from the membrane electrolytic cell which comprises removing spent brine containing dissolved chlorine from the membrane electrolytic cell, feeding the spent brine to a concentration zone, applying microwave energy to the spent brine to produce concentrated brine and a gaseous mixture of chlorine and steam, feeding the concentrated brine and the gaseous mixture to a separation zone, separating the gaseous mixture from the concentrated brine, and returning the concentrated brine to the membrane electrolytic cell.

Process reduces the operating and equipment costs while effectively recovering chlorine and brine values.

4 Claims, 1 Drawing Figure

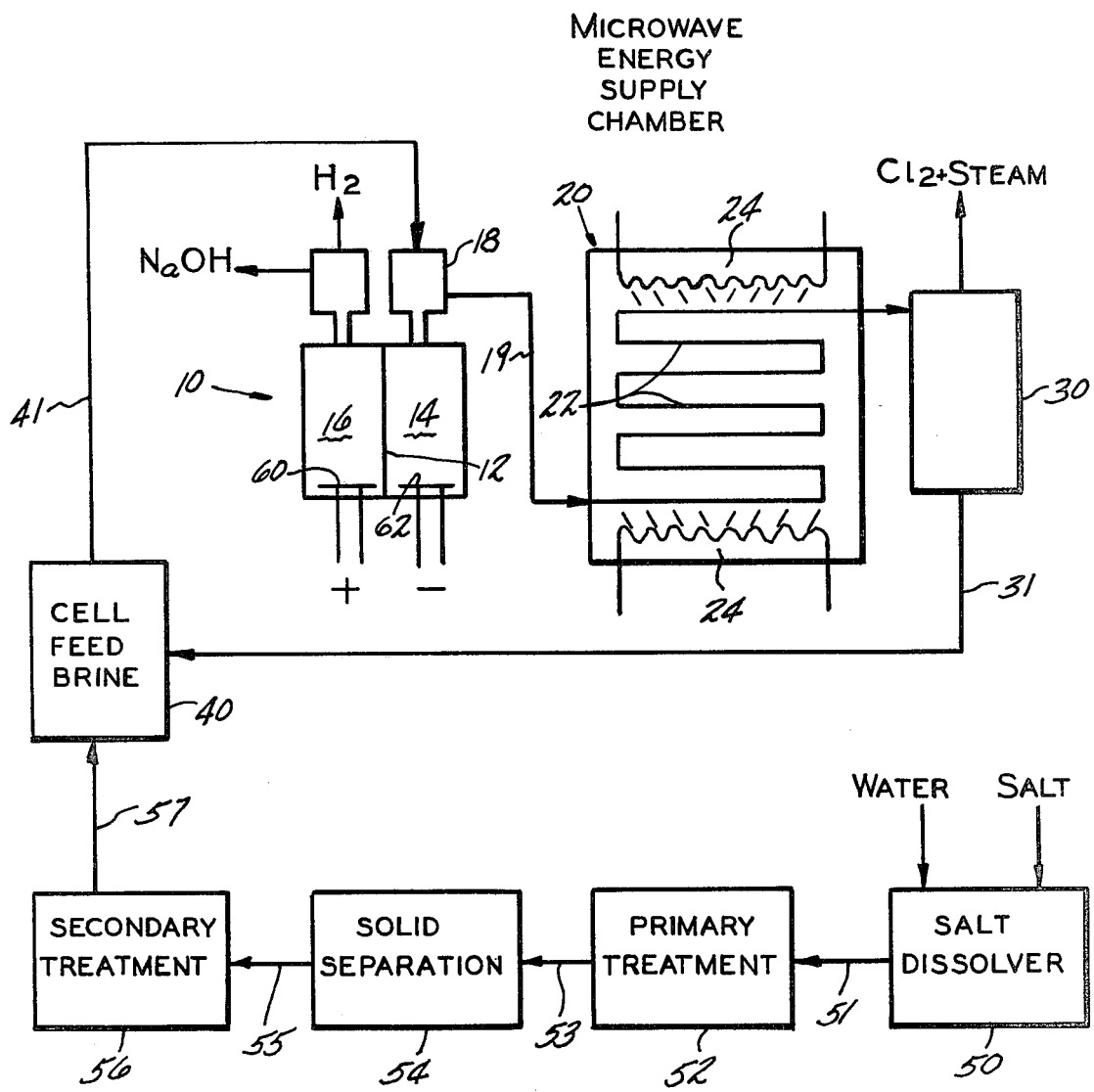

SPENT BRINE CONCENTRATION USING MICROWAVE ENERGY

This invention relates to the treatment of alkali metal chloride brines employed in electrolytic cells for the production of chlorine and alkali metal hydroxides.

The major commercial process for the production of chlorine and alkali metal hydroxides presently employed is the electrolysis of alkali metal chloride brines in diaphragm-type electrolytic cells. Traditionally, the diaphragm used to separate the anode compartment from the cathode compartment in these cells has been an asbestos composition. Presently, however, a concerted effort is being made to find suitable replacements for asbestos diaphragms. One avenue of exploration has led to the development of ion exchange membranes, for example, cation exchange membranes whose use provides a more concentrated alkali metal hydroxide solution having greatly reduced concentrations of impurities. In the membrane electrolytic cell, an alkali metal chloride brine is fed to the anode compartment of the cell. To operate efficiently, brine is fed to the cell to provide amounts of salt in excess of stoichiometric requirements for chlorine and alkali metal hydroxide production by electrolysis. Electrolysis produces chlorine gas in the anode compartment and an alkali metal hydroxide solution in the cathode compartment. The electrolysis thus reduces the concentration of chloride ions and alkali metal ions of this solution and a brine solution is produced containing dissolved chlorine gas. This highly corrosive solution is then removed from the cell as spent brine and treated to remove dissolved chlorine and to concentrate the spent brine. Several methods are currently available for accomplishing this. In one method, the spent brine is dechlorinated by steam stripping or flash evaporating under a vacuum. Dechlorinated spent brine is then resaturated by passing it through a salt bed. Resaturated brine is then chemically treated with an alkali metal carbonate and an alkali metal hydroxide. A final purification step may be used in which the brine is contacted with an ion exchange resin to remove cations such as Ca and Mg produces a highly purified brine of the desired concentration for use in electrolytic membrane cells. This procedure results in the treatment of the entire spent brine stream and requires the use of large equipment and high operating costs due to the consumption of large amounts of chemicals in the purification treatment.

A second method dechlorinates the spent brine and then concentrates dechlorinated spent brine in steam heated multiple effect evaporators. Following evaporation, the spent brine is resaturated by admixture with freshly prepared brine and returned to the membrane cells. In addition to employing costly evaporators, this method results in high maintenance and operating costs as the evaporators are corroded by the brine and suffer extensive scaling due to the formation of deposition of salt cake.

In a third method, the membrane cell is operated with a dilute alkali metal chloride brine. Spent dilute brine from the cell is divided and one portion is dechlorinated and resaturated by the first method as described above. The second portion of spent brine is dechlorinated and combined with the resaturated purified brine and returned to the cells. This method, however, requires a high brine feed rate.

There is a need therefore for a method of treating spent brine from membrane electrolytic cells which avoids the increased operating and equipment costs of known procedures while effectively recovering the chlorine and brine values.

It is an object of the present invention to provide a process for the treatment of spent brine from membrane electrolytic cells which is energy efficient.

Another object of the invention is to provide a process for the treatment of spent brine from membrane electrolytic cells which eliminates the corrosion and scaling of pipes and heat transfer surfaces.

An additional object of the present invention is to provide a process for the treatment of spent brines from membrane electrolytic cells having reduced costs for chemical treatments.

These and other objects of the present invention are accomplished in a process for the concentration of spent brine from a membrane electrolytic cell which comprises:

(a) removing spent brine from the membrane electrolytic cell, (b) feeding the spent brine to a concentration zone, (c) applying microwave energy to the spent brine to produce concentrated brine, and a gaseous mixture of chlorine and steam, (d) feeding the concentrated brine and the gaseous mixture to a separation zone, (e) separating the gaseous mixture from the concentrated brine, and (f) returning the concentrated brine to the membrane electrolytic cell.

More in detail, the FIGURE shows a flow diagram illustrating one embodiment of the process of the present invention in which membrane electrolytic cell 10 employs membrane 12 to separate anode compartment 14 from cathode compartment 16. Purified alkali metal chloride brine flows from head tank 40 through line 41 to chlorine gas disengager 18 from which it is fed to anode compartment 14. During electrolysis of the alkali metal chloride brine, electrical current is fed to anodes 60 in anode compartment 14 and through membrane 12 to cathodes 62 in cathode compartment 16. Chlorine gas is produced in anode compartment 14 and is passed along with spent alkali metal chloride brine through chlorine disengager 18. Chlorine gas is separated from the spent brine and is removed for further processing through an outlet in gas disengager 18. Spent brine passes from chlorine disengager 18 through line 19 to concentration zone 20 which contains a plurality of pipes 22. As the spent brine passes through pipes 22, it is heated by microwave energy supplied by generators 24. Concentrated brine is passed from concentration zone 20 to separator 30. In separator 30, a gaseous mixture of chlorine gas and steam are evolved from the concentrated brine and chlorine and heat values from this gaseous mixture recovered in known ways. The concentrated brine is fed from separator 30 through line 31 to head tank 40 to be mixed with fresh brine. Fresh brine is produced by the addition of salt to dissolver 50 where it is admixed with water or brine. The fresh brine is fed through line 51 to primary treatment zone 52 where it is treated with an alkali metal carbonate and an alkali metal hydroxide to form insoluble compounds with impurities such as alkaline earth metals or iron. Treated brine is fed from primary treatment zone 52 through line 53 to brine filter 54. Insoluble materials are removed from the treated brine during filtering and filtered brine is fed from brine filter 54 to secondary treatment zone 56 through line 55. Secondary treatment zone 56 contains an ion exchange resin which further reduces the concentration of cation impurities to produce a purified brine suitable for use in membrane electrolytic cells. Purified brine is fed through line 57 to head tank 40 to be admixed with concentrated spent brine from separator 30.

In the novel process of the present invention, spent brine from the anode compartment of membrane electrolytic cells is concentrated by the application of microwave energy in a concentration zone. As received from the cells, the spent brine is at cell temperature and contains dissolved chlorine gas and where metal anodes are employed, traces of heavy metals such as titanium and platinum group metals. The spent brine is fed into a resonating cavity containing a group of vessels, for example, a bank of pipes, to which the microwave energy is applied. Unlike known evaporation methods, these vessels can be constructed of non-metallic materials including, for example, ceramic materials or fluorocarbon polymers which are not attacked by the corrosive brine solution and thus do not add undesirable impurities to the brine. During the brine concentration step, no scaling of the pipes results as the microwave energy is imparted to the brine evenly. Scaling occurs in pipes and heat exchangers which employ steam or electrical heating to concentrate spent brines because the inside surfaces of these vessels are hotter than other areas, such as the center of the pipes. Using the novel process of the present invention, the brine is heated uniformly and scaling of pipe surfaces is avoided.

To provide the microwave energy employed by the process of the invention, any suitable source of microwave energy may be used which is capable of generating microwaves having a frequency in the range from 100 to about 10,000 and preferably in the range from about 800 to about 6,000 megaHertz (mHz). Sufficiently microwave energy is applied to evaporate water from the spent brine to raise its concentration to the desired level. For example, spent brine, as received from a cell employing sodium chloride brine, has a concentration in the range of from about 14 to about 22 percent by weight of NaCl. Following the application of microwave energy, the concentrated brine has a NaCl concentration in the range from about 23 to about 26 percent by weight. To achieve this concentration, the spent brine is energized for a suitable time period, for example, from about 1 to about 120, preferably from about 5 to about 60, and more preferably from about 10 to about 30 minutes.

Concentrated brine from the concentration zone is fed to a brine separator in which a gaseous mixture of chlorine and steam are evolved. Dechlorination of the gaseous mixture can be accomplished by any suitable methods including cooling and stripping the condensate with steam. The concentrated brine free of dissolved chlorine is returned to the anode compartment of the membrane electrolyte cell. In a preferred embodiment, the reconcentrated brine is admixed with fresh brine prior to being fed to the cell. Where this is the case, the reconcentrated brine constitutes from about 30 to about 90 and preferably from about 40 to about 80 percent by volume of the total amount of brine fed to the cells.

Where metal anodes are employed in the cell, it may be desirable to treat the reconcentrated brine for the removal of heavy metals, for example, by passing the brine through ion exchange resin columns prior to its return to the cell.

The novel process of the present invention significantly reduces the amount of chemicals required in the brine treatment process as only a small portion of the brine electrolyzed is treated by methods normally used to remove metals such as calcium and magnesium and to provide the pH adjustments required. In addition, the method permits a reduction in the brine inventory required for membrane cell operation as the brine treatment time significantly reduced.

The novel process of the present invention is further illustrated by the following EXAMPLE without any intention of being limited thereby.

EXAMPLE

Sodium chloride brine (16.58 percent by weight of NaCl) was prepared by dissolving 50 grams salt in 250 cubic centimeters of water. The brine (150 cubic centimeters) at a temperature of 24° C., was poured in a flask and the flask placed in a microwave oven. The oven applied microwave energy at a frequency of 2450 mHz using 1500 watt microwave power for a period of 9 minutes during which the brine concentration rose to 22.49 percent by weight of NaCl and the volume of brine was reduced to 120 cubic centimeters.

What is claimed is:

1. A process for the concentration of spent brine from a membrane electrolytic cell which comprises:
    (a) removing spent brine containing dissolved chlorine and from about 14 to about 22 percent by weight of NaCl from said membrane electrolytic cell,
    (b) feeding said spent brine to a concentration zone,
    (c) applying microwave energy to said spent brine to produce concentrated brine and a gaseous mixture of chlorine and steam,
    (d) feeding said concentrated brine and said gaseous mixture to a separation zone,
    (e) separating said gaseous mixture from said concentrated brine, and
    (f) returning said concentrated brine containing from about 23 to about 26 percent by weight of NaCl to said membrane electrolytic cell.

2. The process of claim 1 in which said microwave energy is applied at a frequency of from about 100 to about 10,000 mHz.

3. The process of claim 2 in which said concentrated brine constitutes from about 30 to about 90 percent by volume of the total amount of brine returned to said membrane electrolytic cell.

4. The process of claim 2 in which said microwave energy is applied for a period of from about 1 to about 120 minutes.

* * * * *